April 18, 1933. A. C. HYNAN 1,904,371
DEMOUNTABLE WHEEL LOCK
Filed Aug. 18, 1930
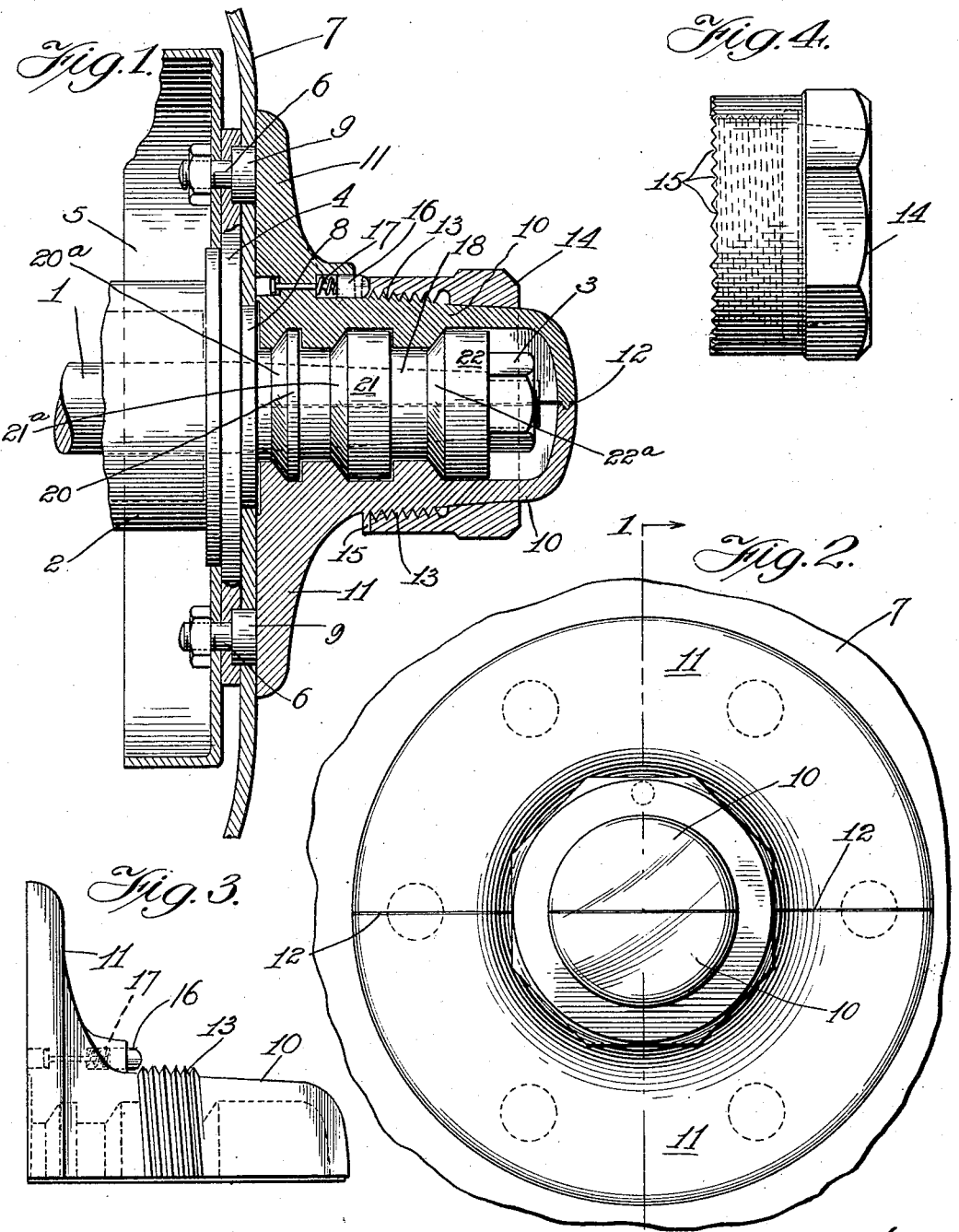
Witness
J. J. Gathmann
Inventor
Arthur C. Hynan
By Bunton & Bunton
Attys.

Patented Apr. 18, 1933

1,904,371

UNITED STATES PATENT OFFICE

ARTHUR C. HYNAN, OF CHICAGO, ILLINOIS, ASSIGNOR TO ROBERT N. BURTON, OF CHICAGO, ILLINOIS

DEMOUNTABLE WHEEL LOCK

Application filed August 18, 1930. Serial No. 475,871.

The purpose of this invention is to provide a wheel and hub construction suitable for automobiles and other vehicles, and adapted to permit quick removal of the wheel proper from its hub as for the purpose of changing tires where pneumatic tires are employed, or for convenience in making repairs. The invention consists in the combination of elements and features of the construction hereinafter shown and described as indicated by the claims.

In the drawing:—

Figure 1 is an axial section of the wheel hub showing a locking device embodying this invention and including a portion of the disc of the wheel proper.

Figure 2 is an end elevation of the hub and locking device shown in Figure 1.

Figure 3 is a side elevation of one of the removable locking members.

Figure 4 is a side elevation of the locking nut.

For purposes of illustration this invention is shown applied to the type of wheel commonly employed on automobiles and known as a disc wheel in which the spokes are replaced with a disc of sheet steel suitably dished and otherwise formed to provide sufficient stiffness for service as the web portion of the wheel. The invention involves making a hub element separate from the wheel proper and providing means for holding the wheel to such hub. For the sake of simplicity of illustration, the axle, 1, is indicated as a simple shaft slightly tapered to receive and drive the hub, 2, which is secured on the tapered portion of the axle by the usual nut, 3. It may be understood that any other relation of this hub to a suitable axle may be employed without departure from the spirit of this invention, as for example making the hub loose on the axle and providing it with anti-friction ball or roller bearings. The hub is formed with a flange, 4, to which a brake drum, 5, is shown secured by bolts, 6. The disc, 7, of the wheel proper is formed with a central aperture which fits snugly and rides upon a smaller flange, 8, of the hub adjacent the flange, 4, while the heads, 9, of the bolts, 6, serve as driving studs to engage suitably positioned apertures in the wheel disc, 7.

For holding the disc, 7, in place on the flange, 8, and against the flange, 4, I provide a split cap composed of the hollow locking members, 10, each of which is formed with a semi-circular flange portion, 11, which engages against the face of the wheel disc, 7. At their diametrical parting plane the two members, 10, are inter-engaged with a tongue and groove connection indicated at 12, and their body portion is externally threaded at 13 to receive the locking nut, 14, which thus holds the two halves, 10, together.

The body portion of the locking members is not quite cylindrical, but is slightly conical or tapered, and this includes the threaded part, 13, so that as the nut, 14, is entered on the threads and screwed thereon, it tends to close the two halves, 10, more tightly together. At locked position the edge of the nut, 14, which is serrated or notched at 15, engages a detent plunger, 16, whose spring, 17, holds it firmly in such engagement to prevent the nut from being jarred loose or worked back by vibration when the wheel is in use.

The reduced extension, 18, of the hub, 2, which fits over the tapered portion of the axle, as shown, is formed with one or more flanges,—three as shown in the example illustrated,—which are indicated at 20, 21 and 22, respectively.

The face of each of these flanges which is toward the wheel disc, 7, is slightly inclined, as indicated at 20ª, 21ª and 22ª, respectively. The interior of the hollow locking members, 10, is formed with grooves which provide inclined shoulders positioned to engage the inclined faces of these flanges of the hub, so that as the two locking members, 10, are crowded together by the advance of the locking ring, 14, thereover, the inclined shoulders of the locking members are crowded forward toward the wheel disk, 7, thus carrying the flanges, 11, of the locking device into forcible engagement with the wheel disc and pressing it firmly against the flange, 4, of the hub. It results that when the locking nut, 14, has been screwed on far enough to be effectively retained by the detent, 16, it will have clamped the locking member, 10, firmly onto the hub extension, 18, and at the same time will have wedged the locking members so tightly against the wheel disc, 7, as to hold the latter firmly in position on the hub and in driving engagement with the heads, 9, of the stud bolts, 6.

It will be evident that whenever it is desired to remove the wheel proper, including the disc, 7, from the hub, 2, this may be accomplished very quickly and easily by the mere removal of the locking nut, 14, which will release the separable halves, 10, 10, of the locking device and permit the wheel to be removed in axial direction over the hub extension, 18. Replacement of the wheel or substitution of another one for it will be quite as simple and may be accomplished in a few seconds of time.

I claim:

1. The combination of a wheel and a separable hub therefor having a transaxial flange against the outer face of which the body of the wheel is normally disposed, and a reduced portion extending through a central aperture in said wheel, said reduced portion having a transaxial circumferentially encompassing groove having its inwardly facing wall inclined outwardly with respect to said outer face of the first mentioned flange, and the opposite wall substantially directly transaxial, and a locking member comprising a two-part hollow fitting encompassing the reduced portion of the hub formed with an internal transaxial flange dimensioned for occupying said groove having its outer face inclined to bear against the inclined face of the hub flange and cooperate therewith for effecting relative movement of said cooperating parts in axial direction, and having other flange portions bearing against the body of the wheel, and operable means independent of said wheel for urging the parts of said locking member transaxially for crowding said other flange portions against said wheel body.

2. The combination of a wheel and a separable hub therefor having a transaxial flange against the outer face of which the body of the wheel is normally disposed, and a reduced portion extending through a central aperture in the wheel, said reduced portion having a transaxial circumferential encompassing groove having its inwardly facing wall sloping radially toward the axis of the hub and thereby inclined outwardly with respect to the outer face of the first mentioned flange and with respect to the wheel body and having its opposite wall substantially directly transaxial, a locking member formed to be disposed between said inclined and directly transaxial walls, dimensioned for clearance therebetween at least equal to the radial divergence of said inclined and transaxial walls of the groove, and means operating independently of said wheel for forcing said locking member transaxially for wedging it in an axial direction relative to said wheel body and the first mentioned flange of the hub.

3. A locking member for securing a wheel to a hub, said hub having a transaxial flange against whose outer face the body of the wheel is held by the locking member, and said locking member having a flange which bears against said body for so holding it, said wheel hub having a reduced portion extending through a central aperture in the wheel provided with transaxial flanges, the locking member comprising a diametrically split sleeve internally dimensioned for embracing the hub at the flanged portion thereof and having at least one interiorly protruding annular flange for cooperating with a flange of the hub, the flanges of the reduced part of the hub having their faces toward the first mentioned hub flange beveled radially with respect to the hub axis, and their opposed faces directly transaxial, the cooperating flange of the locking member having its face toward said first mentioned flange directly transaxial and its opposite face beveled radially conformed to the beveled face of the hub flange for cooperating therewith to wedge the locking member inwardly along the hub in the closing together of the two parts of the split sleeve, and means for closing said sleeve parts together, said sleeve parts being exteriorly tapered at the outer part of their axial extent having a threaded part inwardly adjacent to said tapered part, and a locking ring threaded to engage said threaded portion and having an adjacent tapered bore to fit the tapered portions of the split sleeve for crowding them together toward the axis of the hub and crowding said cooperating beveled faces of the locking member and hub flange together for wedging the hub and locking member in axial direction relative to each other.

ARTHUR C. HYNAN.